United States Patent [19]

Ichikawa et al.

[11] Patent Number: 5,386,259
[45] Date of Patent: Jan. 31, 1995

[54] COORDINATING MECHANISM FOR PICTURE IMAGE AREA AND FIELD FRAME SIZE ADJUSTING APPARATUS OF CAMERA

[75] Inventors: Yuichi Ichikawa; Kosei Kosako, both of Tokyo, Japan

[73] Assignee: Asahi Kogaku Kogyo Kabushiki Kaisha, Tokyo, Japan

[21] Appl. No.: 150,865

[22] Filed: Nov. 12, 1993

[30] Foreign Application Priority Data

Jan. 18, 1993 [JP] Japan .................. 5-000923[U]

[51] Int. Cl.⁶ .................. G03B 13/10; G03B 37/00
[52] U.S. Cl. ................. 354/94; 354/159; 354/222
[58] Field of Search ............ 354/159, 94, 222

[56] References Cited

U.S. PATENT DOCUMENTS

| | | | |
|---|---|---|---|
| 4,716,427 | 12/1987 | Shyu | 354/159 |
| 5,010,357 | 4/1991 | Misawa | 354/159 |
| 5,066,971 | 11/1991 | Kodaira | 354/159 X |
| 5,258,790 | 11/1993 | Tanaka | 354/94 |

*Primary Examiner*—Howard B. Blankenship
*Assistant Examiner*—J. K. Han
*Attorney, Agent, or Firm*—Sandler Greenblum & Bernstein

[57] ABSTRACT

An apparatus for adjusting the size of a picture image area and field frame of a view finder in an associated manner. The apparatus includes a picture image area restricting member which is linearly movable into and out of a photographing aperture, a field frame restricting member which is rotatably movable into and out of the field frame, a rotatable operating member for moving the picture image area restricting member, and a driving member which is linearly driven by the rotation of the operating member to rotate the field frame restricting member.

22 Claims, 16 Drawing Sheets

COORDINATING MECHANISM FOR PICTURE IMAGE AREA AND FIELD FRAME SIZE ADJUSTING APPARATUS OF CAMERA

BACKGROUND OF THE INVENTION

1. Field of the Invention

The present invention relates to an apparatus for adjusting the size of a picture plane and the size of an associated field frame.

2. Description of Related Art

In a panoramic photograph, a predetermined portion, located on upper and lower edges of a frame of a film when a camera is held in an ordinary (i.e. horizontal) position, is not used in order that an elongated print may be obtained. Panoramic photographing is generally effected by providing a light intercepting mechanism for preventing upper and lower edges of a film frame from being exposed.

In such a camera having a panoramic shot mode, for example, it is known to provide a pair of upper and lower light intercepting plates (i.e., picture plane restricting plates) in a photographing aperture. The light intercepting plates can be moved from a retracted position to an operative position in which the light intercepting plates partly cover the upper and lower edges of the picture plane in association with the transfer of the camera into the panoramic shot mode. In such a camera, a pair of upper and lower field restricting plates are provided. The field restricting plates are moved into the field of view of the view finder in association with the change in picture plane size so that a photographer can see the photographable range of the picture plane which has been reduced at the upper and lower edges thereof.

The association mechanism of the picture plane and field frame adjustment involves considerably complexity, particularly in a conventional camera in which a panoramic photograph is made available by switching the photographing mode to the panoramic shot mode.

SUMMARY OF THE INVENTION

It is an object of the present invention to provide a simple size adjusting apparatus that adjusts the sizes of a picture plane and a field frame in association with each other.

To achieve the object mentioned above, according to the present invention, there is provided an apparatus for adjusting the size of a picture image area and a field frame of a view finder in an associated manner, including a picture image area restricting member that is linearly movable into and out of a photographing aperture, a field frame restricting member that is rotatably movable into and out of the field frame, a rotatable operating member for moving the picture image area restricting member, and, a driving member which is linearly driven by the rotation of the operating member to rotate the field frame restricting member.

Preferably, the picture image area restricting member comprises a driving restriction plate which is directly moved by the rotatable operating member and a driven restriction plate which is linearly moved in a direction opposite to the direction of the movement of the driving restriction plate in association with the movement of the driving restriction plate.

In a described embodiment, a field frame restricting member includes a pair of field frame restricting plates having restricting plate portions which are selectively moved into the field frame of the finder to partly cover the field frame, at upper and lower edges thereof, to thereby intercept light.

Provision is made for a finder body which defines an optical path of a finder optical system of the finder. Each of the field frame restricting plates is provided with shaft portions which can be rotatably supported by the finder body on opposite sides of the restricting plate portions, and a rotation transmitting portion which is integral with and offset from one of the shaft portions.

A snap-action mechanism is also provided which causes a quick rotation of the field frame restricting plates immediately past a point of instability. The snap-action mechanism can be comprised of a torsion spring which is engaged at opposite ends thereof by the rotation transmitting portions.

Preferably, the rotatable operating member includes a rotor having a circular body which is provided thereon with a first engaging projection to be connected to the picture image area restricting member, and a second engaging projection to be connected to the field frame restricting member.

The first engaging projection for the restriction of the picture image area can be provided on a radial arm extending from the circular body in the radial direction, and the second engaging projection for the restriction of the field frame can be provided on a peripheral edge of the circular body and angularly spaced from the first engaging projection at approximately 90 degrees with respect to a center axis of the circular body.

Preferably, an operational handle is provided on an associated camera body to manually rotate the rotatable operating member.

BRIEF DESCRIPTION OF THE DRAWINGS

The invention will be described below in detail with reference to the accompanying drawings, in which.

DESCRIPTION OF THE PREFERRED EMBODIMENT

Figure 1:
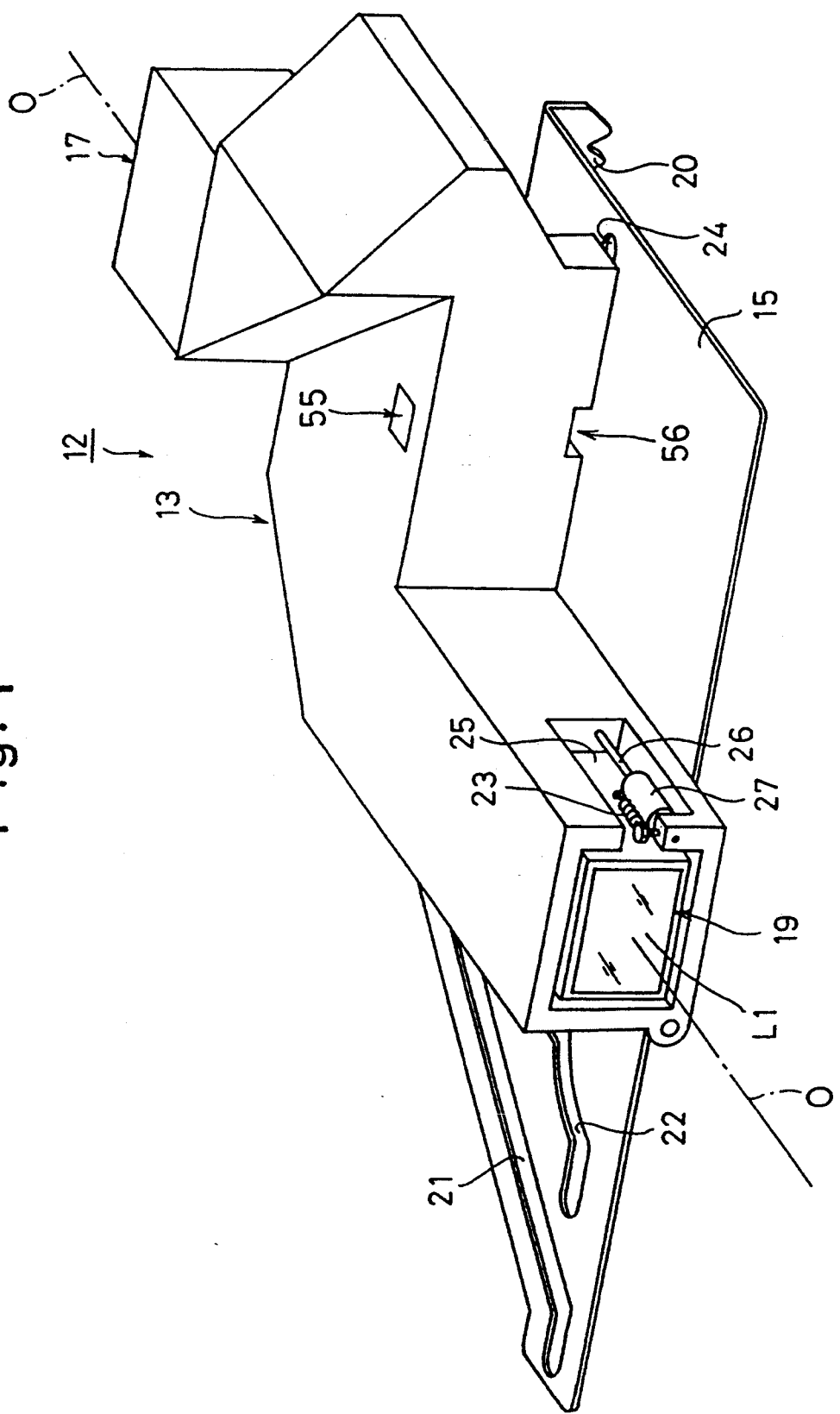
FIG. 1 is a perspective view of a zoom finder according to the present invention.

First, referring to FIG. 16, a lens shutter type camera 10 to which the present invention is applied will be discussed below.

The camera 10 has a camera body 9 in which a zoom photographing optical system (not shown) and a zoom finder optical system (FIG. 2) are provided. The camera body 9 is provided with a film compartment 7 and a film winding chamber 8 on right and left sides of the camera body. A photographing aperture 11, defined by upper and lower aperture frames 5, is provided between the film compartment 7 and the film winding chamber 8. A back cover 14, having a film keeping plate 42, is hinged to one end of a rear wall 16 of the camera body 9 to open and close the photographing aperture 11. The camera body 9 is provided, on the upper and middle portion of the rear wall 16 thereof, with a finder view window 17.

In FIG. 1, a real image type zoom finder 12 provided in the camera 10 includes the zoom finder optical system, which is separate from the zoom photographing optical system. The zoom finder 12 is provided with a finder body 13 and a cam plate 15.

Figure 2:
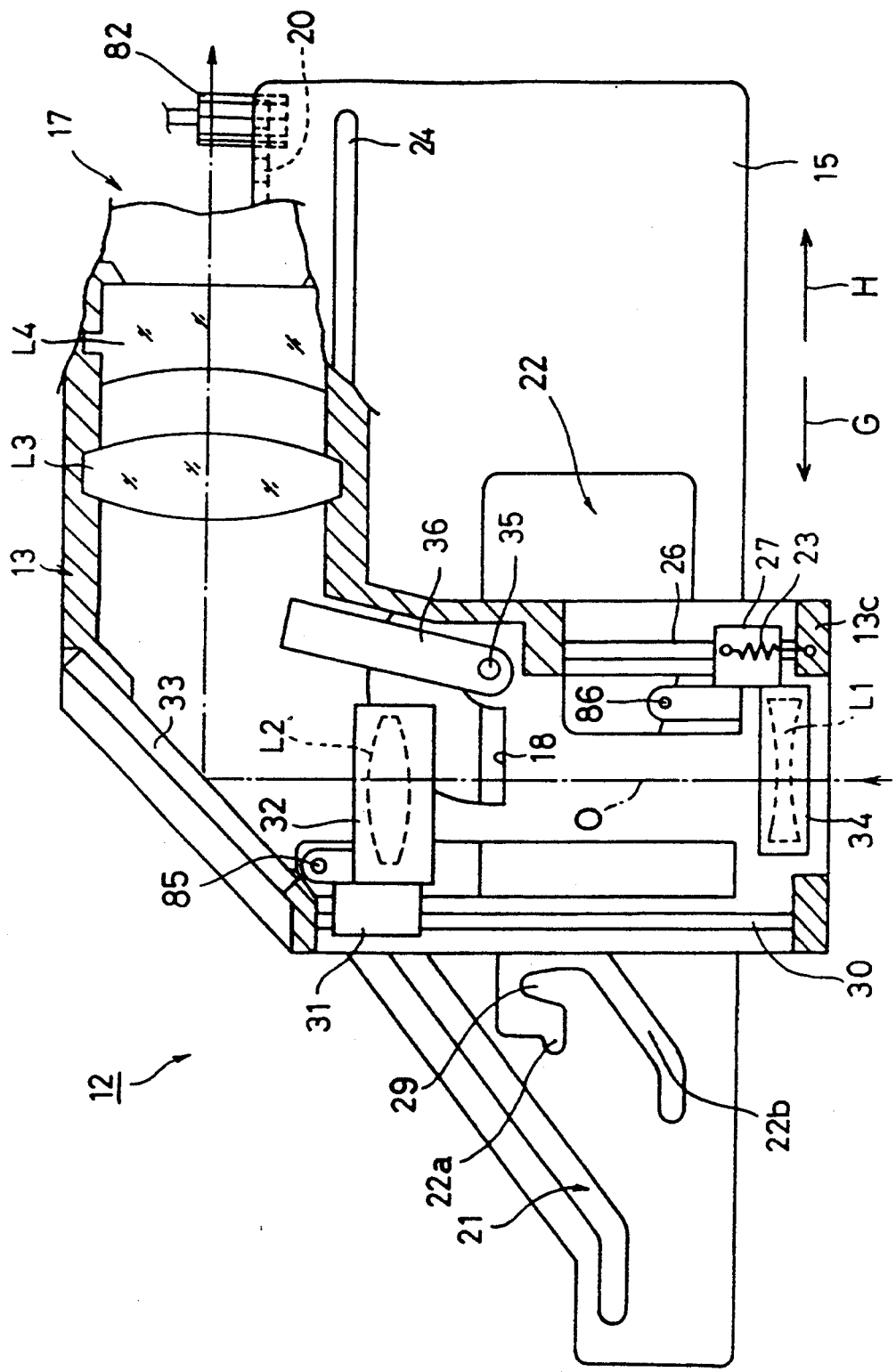
FIG. 2 is a sectional plan view of the zoom finder shown in FIG. 1 when an associated taking lens is in an accommodating section.

As can be seen in FIG. 2, the finder body 13 is generally L-shaped in a plan view and includes a first lens assembly L1 (i.e., objective lens assembly), a second lens assembly L2, a third lens assembly L3, a fourth lens assembly L4, a prism (not shown), and a fifth lens assembly L5 (FIG. 16) in this order from the object side. The third, fourth and fifth lens assemblies L3, L4 and L5 are immovable. The third and fifth lens assemblies L3 and L5 have a positive power and the fourth lens assembly L4 has a negative power.

The first and second lens assemblies L1 and L2 are variable power lens assemblies which are moved in relation to each other in the optical axis direction according to a predetermined relationship The first lens assembly L1 has a negative power and the second lens assembly L2 has a positive power, respectively. The optical path of the first and second lens assemblies L1 and L2 is substantially perpendicular to the optical path of the third and fourth lens assemblies L3 and L4. Between the optical paths, a reflecting plate 33 is provided and is inclined at a predetermined angle to bend light transmitted through the first and second lens assemblies L1 and L2 by approximately 90°, so that the light is made incident upon the third, fourth and fifth lens assemblies L3, L4 and L5.

The first lens assembly L1 is held by a first movable lens frame 34 secured to a guide ring 27, so it can move in opposite directions along the optical axis O. The guide ring 27 is movably guided by a guide bar 26 which is provided on one side of the front end of the finder body 13 and extends in the forward and backward directions of the finder body 13. The guide ring 27 is provided with a tensile spring 23 which is connected at its one end to the guide ring 27 and at the other end to a front end 13c of the finder body 13, so that the guide ring 27 and, accordingly, the first lens assembly L1 are continuously biased forward in the optical axis direction O by the tensile spring 23. The first lens frame 34 is provided with a cam pin 86 which projects downward (i.e., in the direction perpendicular to the sheet of the drawing in FIG. 2); from the finder body 13 and which is moved by a cam plate 15.

The second lens assembly L2 is held by a second movable lens frame 32 secured to a guide ring 31 so as to move in the optical axis direction O in opposite directions. The guide ring 31 is movably guided by a guide bar 30 which is provided on the other side of the front end of the finder body 13 and extends in the forward and backward directions thereof. The second lens frame 32 is provided with a cam pin 85 which projects downward (i.e., in the direction perpendicular to the sheet of the drawing in FIG. 2) from the finder body 13 and which is moved by the cam plate 15.

Figure 5:
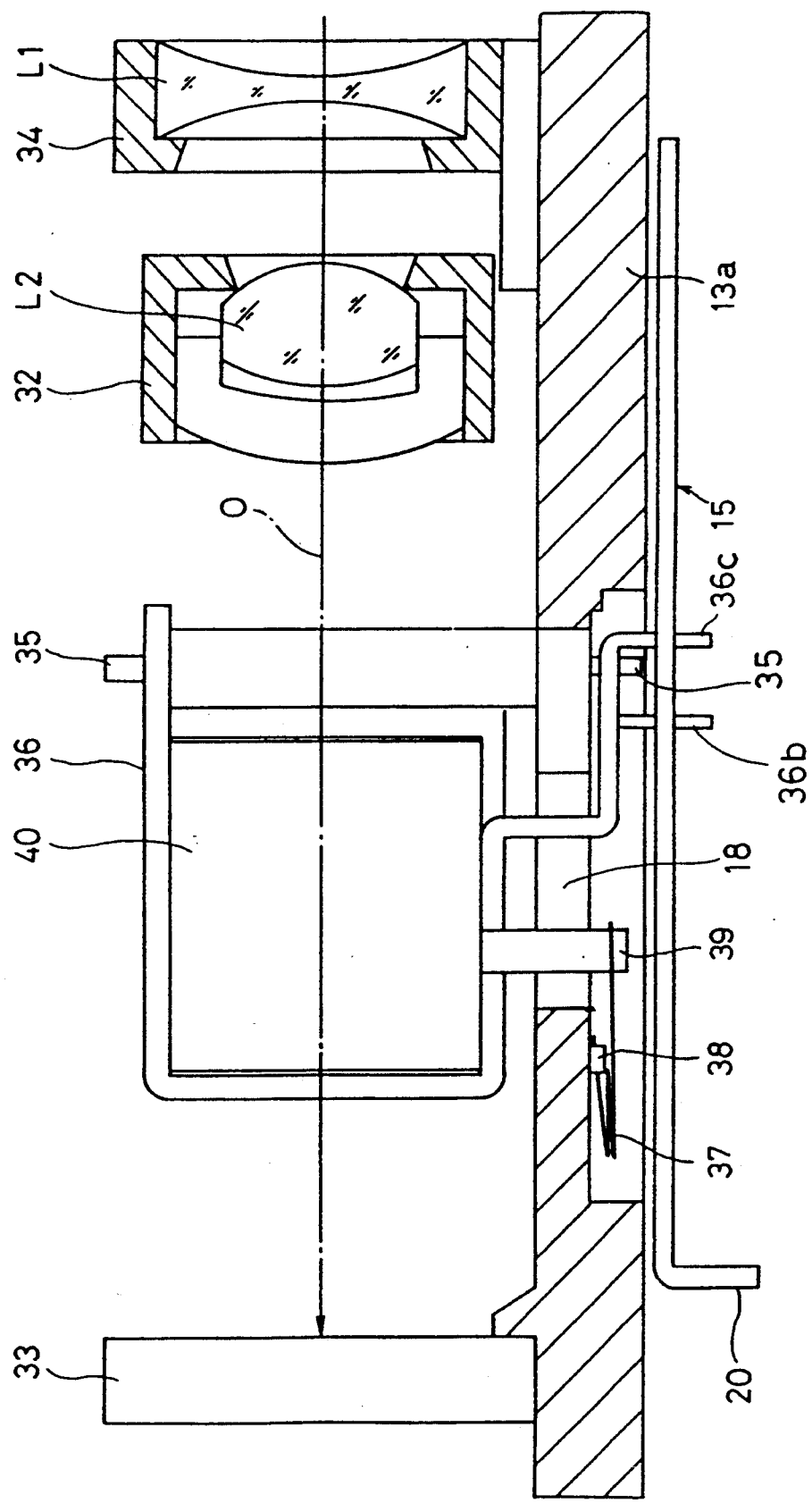
FIG. 5 is an elevated end view of a zoom finder viewed in direction D of FIG. 3.
Figure 6:
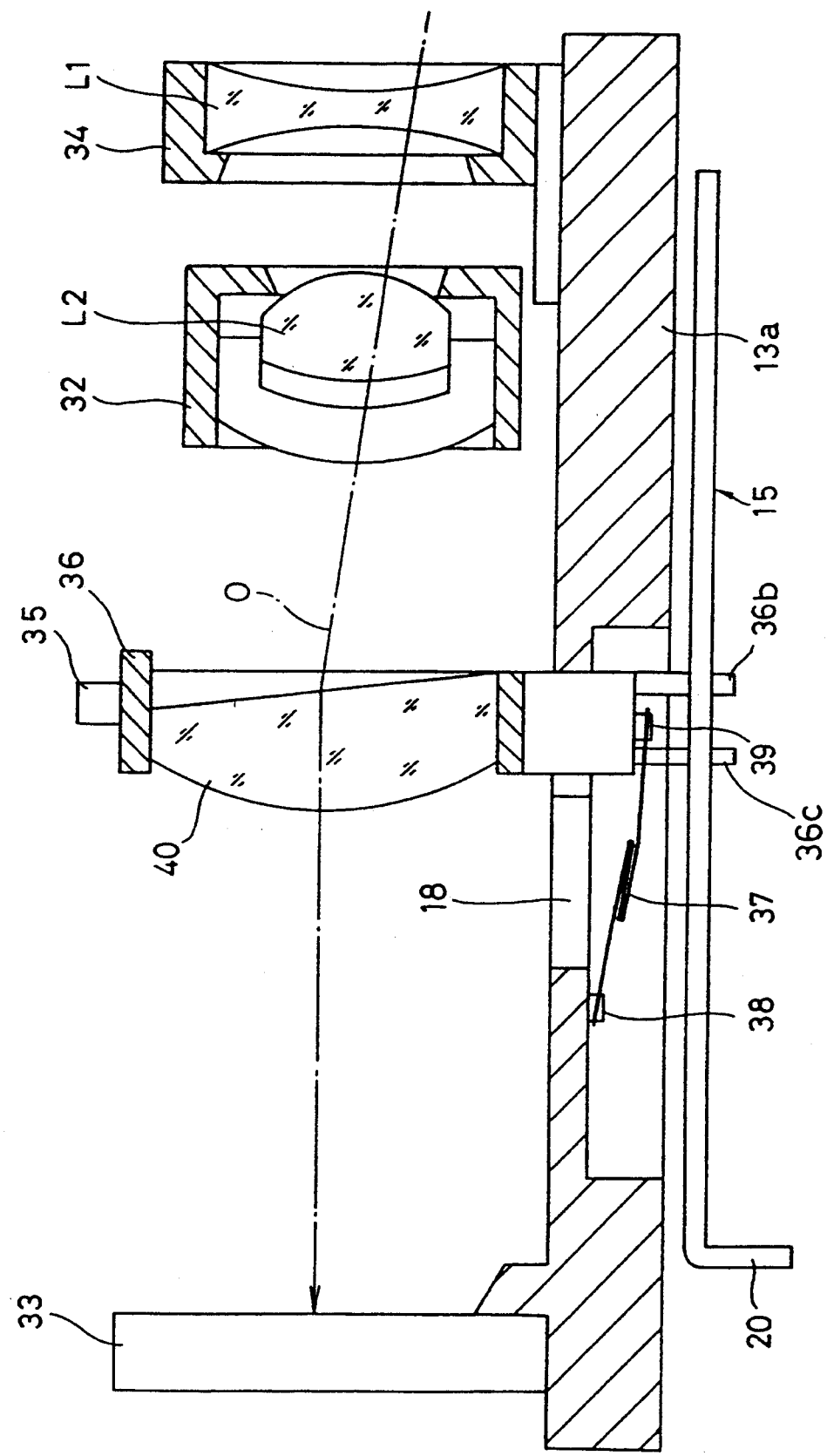
FIG. 6 is an elevated end view of a zoom finder viewed in direction E of FIG. 4.

A prism frame 36 is provided optically behind the guide bar 26 and is rotatable about a pivot shaft 35 which is in turn supported by the finder body 13. A parallax error compensating prism 40 is held by the prism frame 36, as can be seen in FIG. 5. Consequently, the parallax error compensating prism 40 is rotatable between a compensating position in which the parallax error compensating prism 40 is in the optical path of the zoom finder optical system and a retracted position in which the parallax error compensating prism 40 is retracted from the optical path of the zoom finder optical system.

The finder body 13 is provided on a lower wall portion 13a thereof, with a sectoral guide groove 18 whose profile corresponds to the locus of the rotational movement of the prism frame 36 (i.e., the parallax error compensating prism 40). The prism frame 36 is provided with a spring engaging projection 39 and a pair of engaging fingers 36b and 36c, that project downward (i.e., in the direction perpendicular to the sheet of the drawing in FIG. 7 or 8) from the guide groove 18. The engaging fingers 36b and 36c are angularly spaced from one another by about 90° with respect to the pivot shaft 35, so that when the prism frame 36 is located in the retracted position shown in FIG. 3, the engaging finger 36c is engaged by a switching pawl 29 which is moved in the direction H in FIG. 7.

Figure 3:
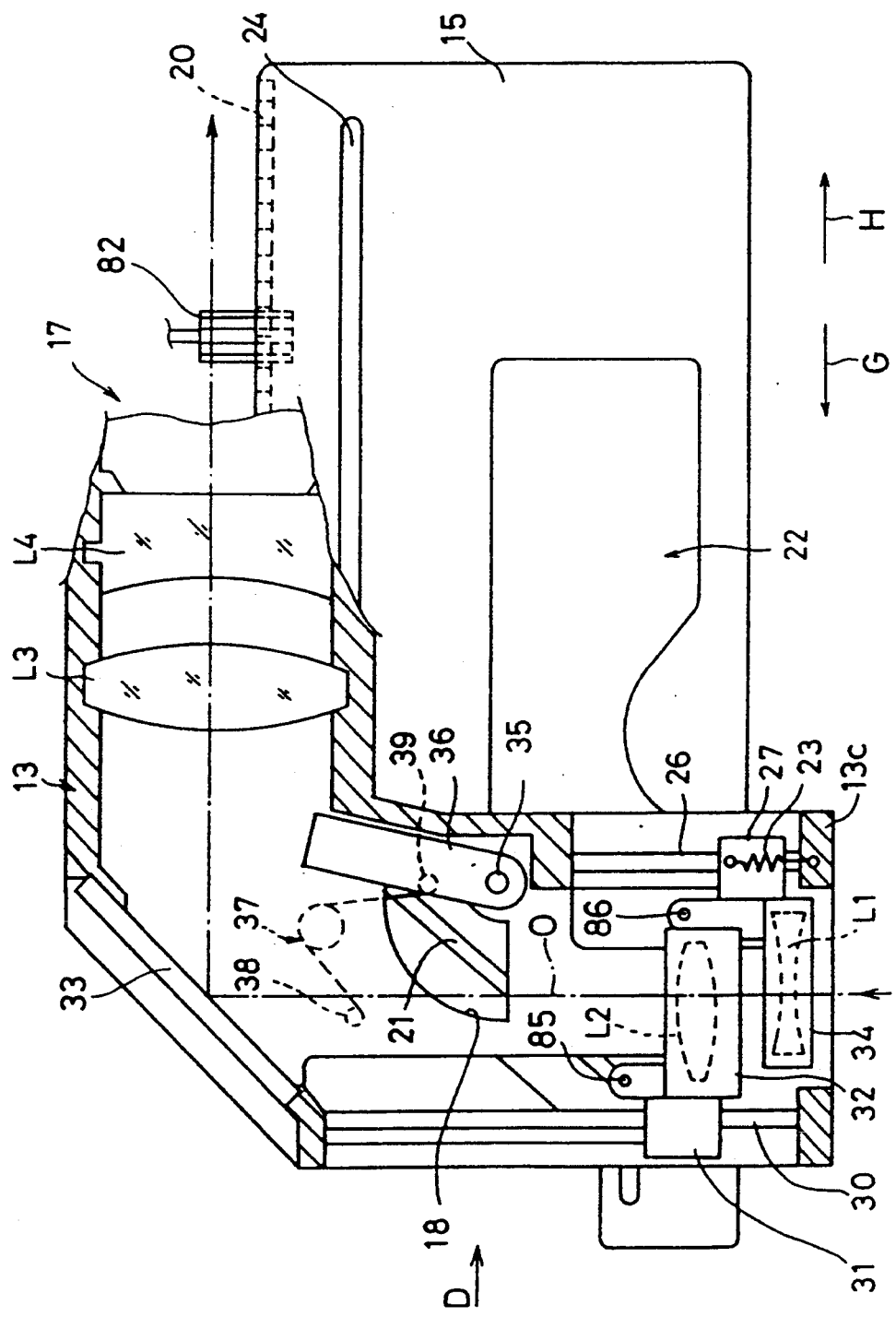
FIG. 3 is a sectional plan view of the zoom finder shown in FIG. 1 in a retracted position in which a parallax error compensating prism is retracted from an optical path of a zoom finder optical system.
Figure 4:
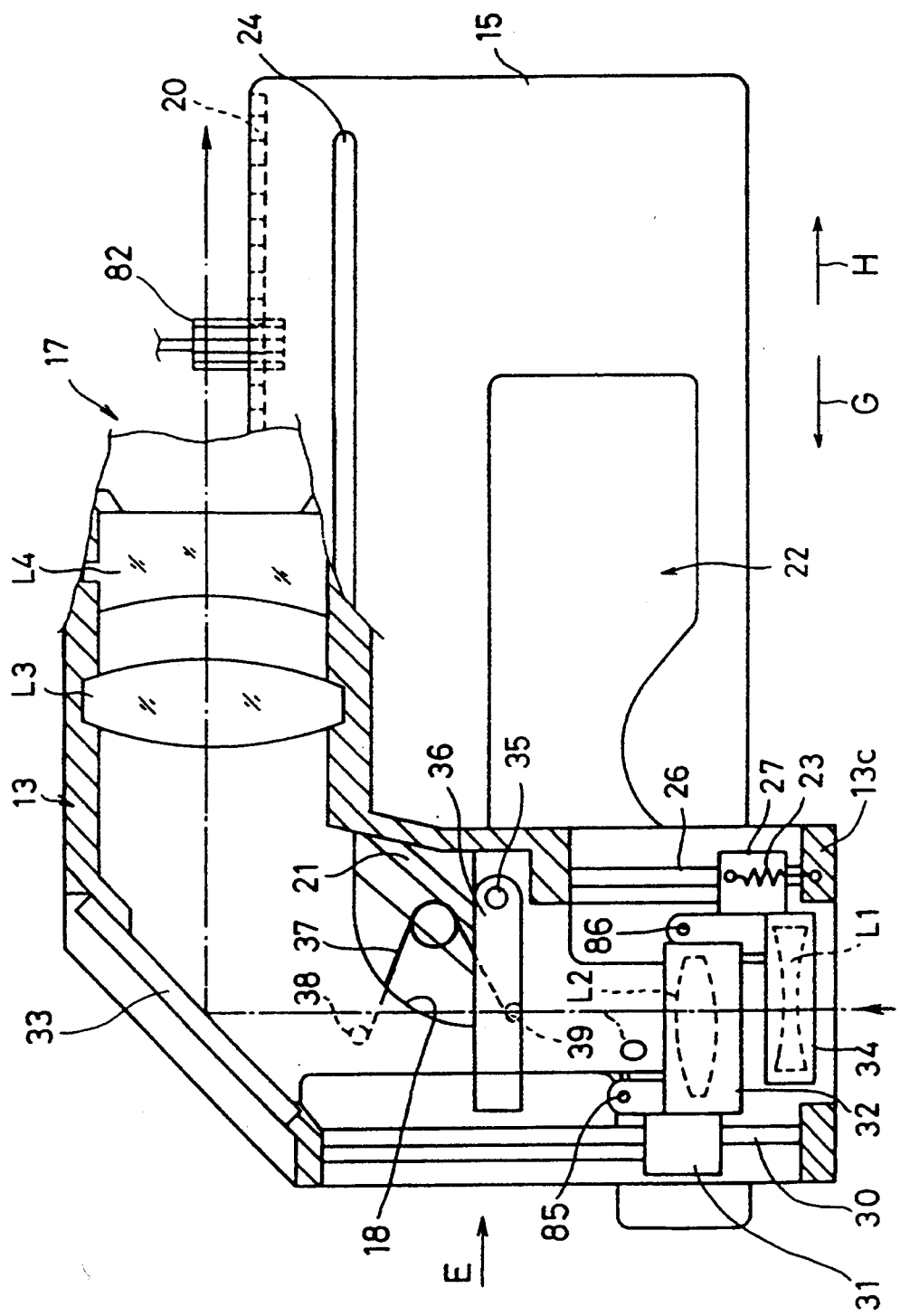
FIG. 4 is a sectional plan view of the zoom finder shown in FIG. 1 in a compensating position in which a parallax error compensating prism is in an optical path of a zoom finder optical system.
Figure 8:
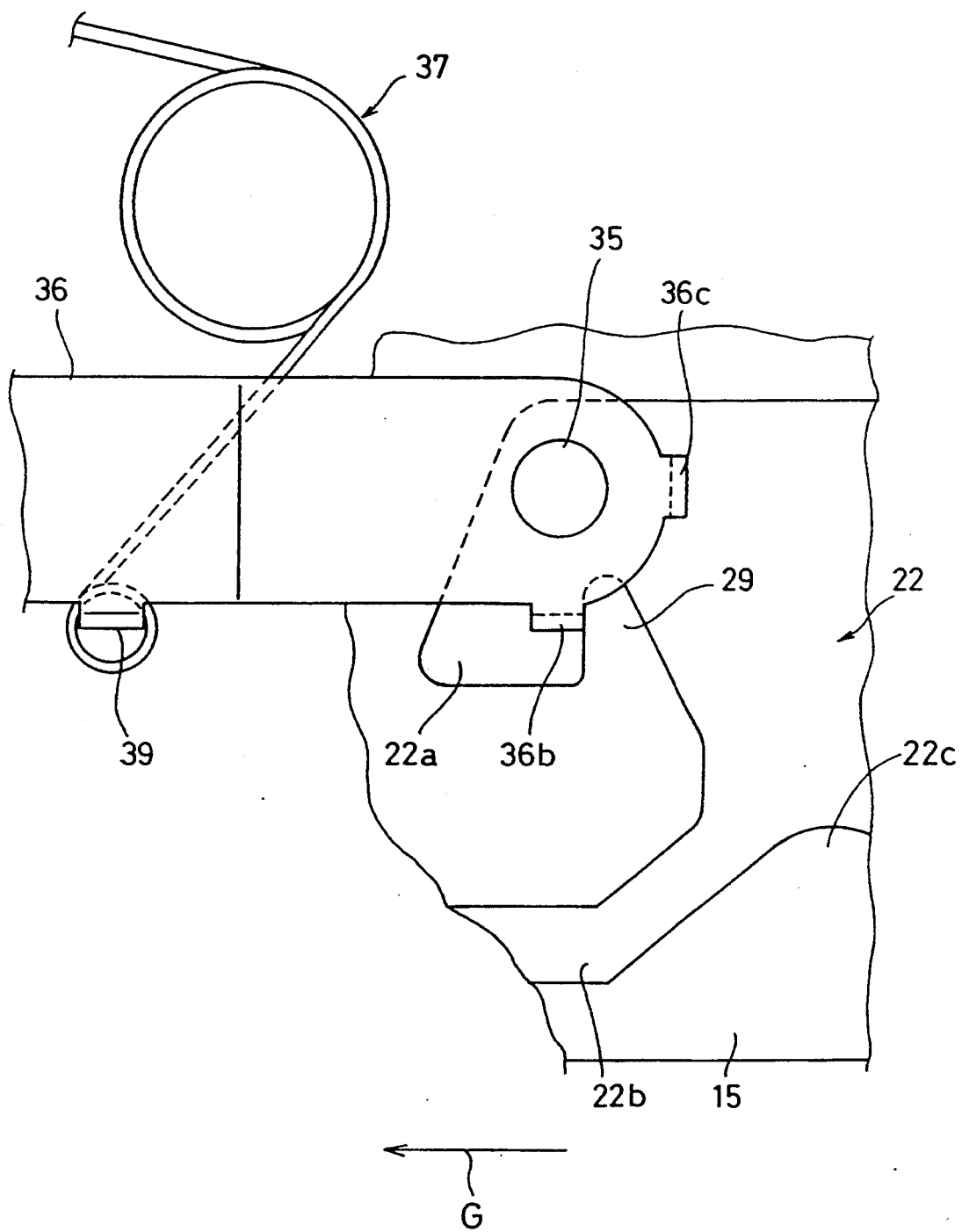
FIG. 8 is an enlarged view of a parallax error compensating prism, which is located in an optical path of a zoom finder optical system, and a switching pawl.

When the prism frame 36 is located in the compensating position shown in FIG. 4, the engaging finger 36b is engaged by the switching pawl 29 which is moved in the direction G in FIG. 8. The prism frame 36 is positioned so that when the engaging fingers 36b and 36c are in the retracted position, the prism frame 36 constitutes a diaphragm for the optical path of the finder optical system (FIGS. 2 and 3).

As can be seen in FIG. 5, a first spring engaging projection 38 is provided on the lower wall portion 13a of the finder body 13 on the side opposite to the pivot shaft 35 with respect to the guide groove 18. A second spring engaging projection 39 is angularly moved together with the prism frame 36 within the guide groove 18. A torsion spring 37 is engaged at opposite ends thereof by the first and second spring engaging projections 38 and 39. This constitutes a snap-action mechanism that quickly rotates the prism frame 36 (i.e., parallax error compensating prism 40) to the retracted position or the compensating position, immediately past a point of instability.

Figure 7:
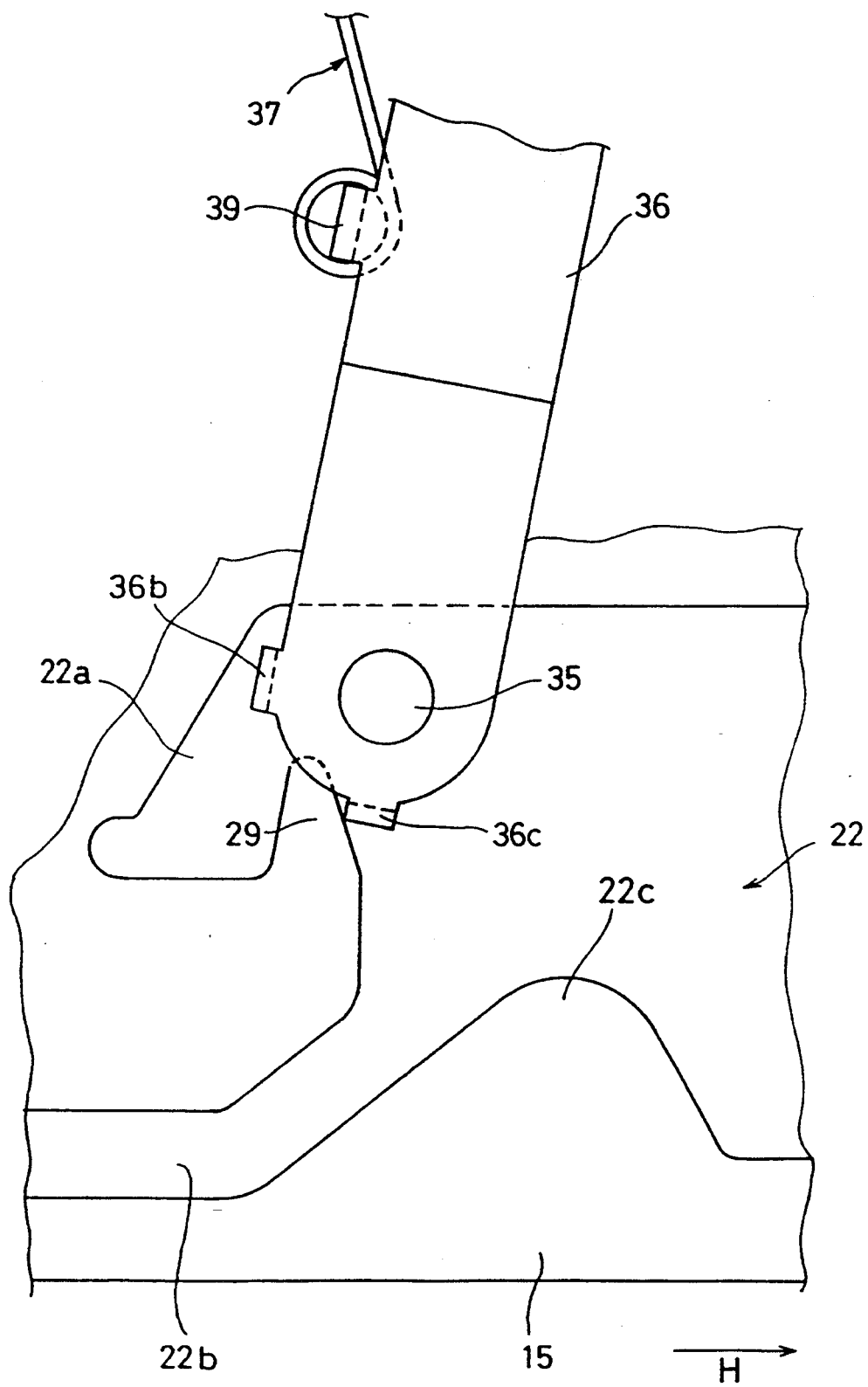
FIG. 7 is an enlarged view of a parallax error compensating prism, which is retracted from an optical path of a zoom finder optical system, and a switching pawl.
Figure 9:
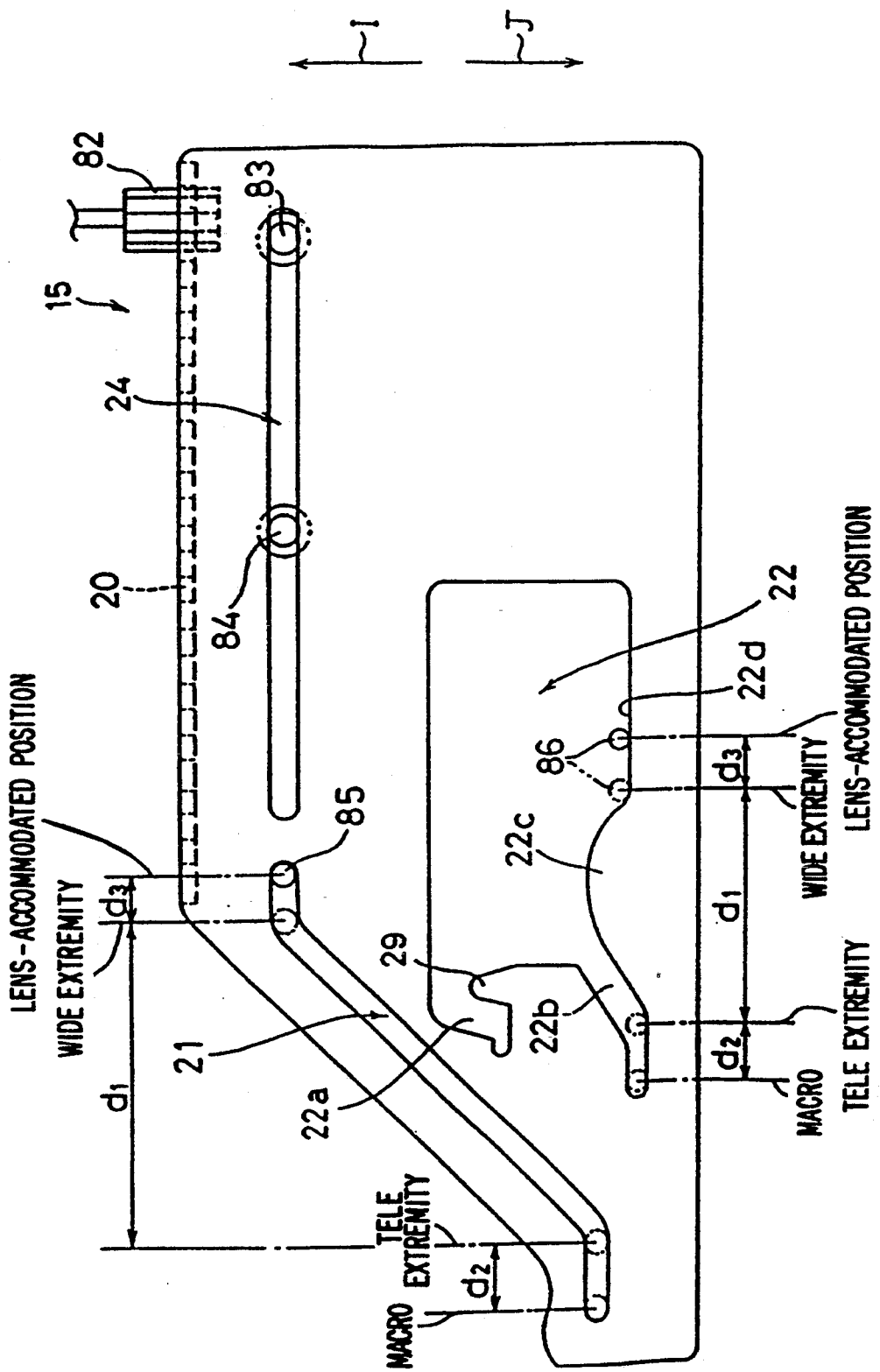
FIG. 9 is a plan view of a single cam plate.

As can be seen in FIG. 9, the switching pawl 29 is integrally provided on the cam plate 15, so that the switching pawl 29 is moved together with the cam plate 15 in opposite directions to apply the rotational force to the prism frame 36 (i.e., parallax error compensating prism 40) towards the point of instability. Consequently, when the macro mode is selected, so that the cam plate 15 is moved towards the macro section (i.e., direction H in FIG. 3), the engaging finger 36c is engaged by the switching pawl 29, whereby the engaging finger 36c is pressed in the same direction (FIG. 7). As a result, the prism frame 36 is rotated in the counterclockwise direction (FIG. 3) towards the point of instability.

Similarly, when the cam plate 15 is transferred to the zoom photographing section from the macro section (direction G in FIG. 4), the engaging finger 36b is engaged and pressed by the switching pawl 29 in the same direction (FIG. 8). As a result, the prism frame 36 is rotated in the clockwise direction towards the point of instability.

The single cam plate 15 with the finder body 13 removed is shown in FIG. 9. The cam plate 15 is provided, on one side thereof adjacent to the eyepiece side (direction I), with a rack 20 which is in mesh with a pinion 82 which is provided on the camera body 9 to rotate in association with the zoom photographing optical system. The cam plate 15 is also provided with a guide groove 24 which extends in parallel with the rack 20. Guide pins 83 and 84 secured to the bottom of the finder body 13 and spaced from one another are movably fitted in the guide groove 24. Consequently, the cam plate 15 is guided to move in the lateral direction of the camera 10 within the effective length of the guide groove 24 in accordance with the engagement of the guide pins 83 and 84 in the guide groove 24.

Also, the cam plate 15 is provided with a cam opening 22 and a cam groove 21 in which a cam pin 85 provided on the second lens frame 32 is fitted. The cam opening 22 is comprised of a cam groove portion 22b, cam portions 22c and 22d, and a receptacle portion 22a. A cam pin 86 of the first lens assembly L1 urged towards the object side by the guide ring 27 is guided in the cam opening 22. The switching pawl 29 of the prism frame 36 which selectively engages with the engaging finger 36b or 36c of the prism frame 36 projects into the receptacle portion 22a. The movable (i.e., rotatable) engaging finger 36b is also fitted in the receptacle portion 22a. The cam groove 21 has a taking lens accommodating section d3 in which the first lens frame 34 (first lens assembly L1) and the second lens frame 32 (second lens assembly L2) can be moved or retained.

The taking lens accommodating section d3 is defined by a linear profile which the shortest focal length of the zoom photographing optical system is maintained. The zoom section d1 corresponding to the cam portion 22c of the cam opening 22 is defined by an oblique or curved profile, so that the first and second lens assemblies (variable power lens assemblies) L1 and L2 can be moved in the optical axis direction to vary the magnification thereof in accordance with the magnification of the zoom photographing optical system. The macro section d2 is defined by a linear profile, similar to the taking lens accommodating section d3, so that when the first and second lens assemblies L1 and L2 are located at the telephoto extremity in the macro section d2, if the engaging finger 36c is engaged and pressed by the switching pawl 29, the prism frame 36 is rotated in the counterclockwise direction to the state shown in FIG. 4.

The rack 20, the cam groove 21, the cam opening 22, the guide groove 24, and the switching pawl 29, of the cam plate 15 can be all integrally formed by a press machining, which is known per se.

Figure 14:
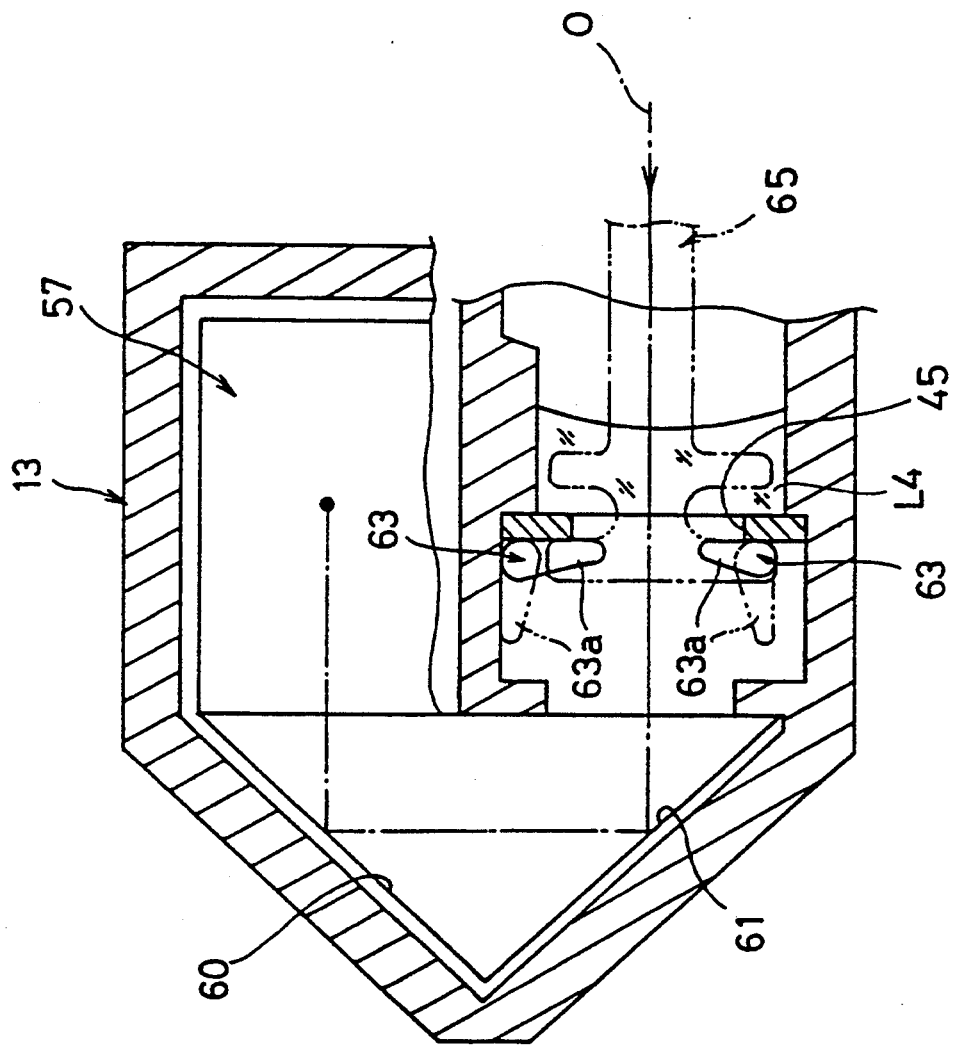
FIG. 14 is a rear view of a pair of field frame restricting plates provided below a view window of a finder.

A pair of field frame restricting plates 63 are provided below the finder view window 17 (FIG. 16) and behind the fourth lens assembly L4, as shown in FIG. 14. The field frame restricting plates 63 lie in planes perpendicular to the optical path of the finder optical system (i.e., perpendicular to the drawing of FIG. 14) and are rotatable about respective shaft portions 63b (FIG. 15).

Figure 15:
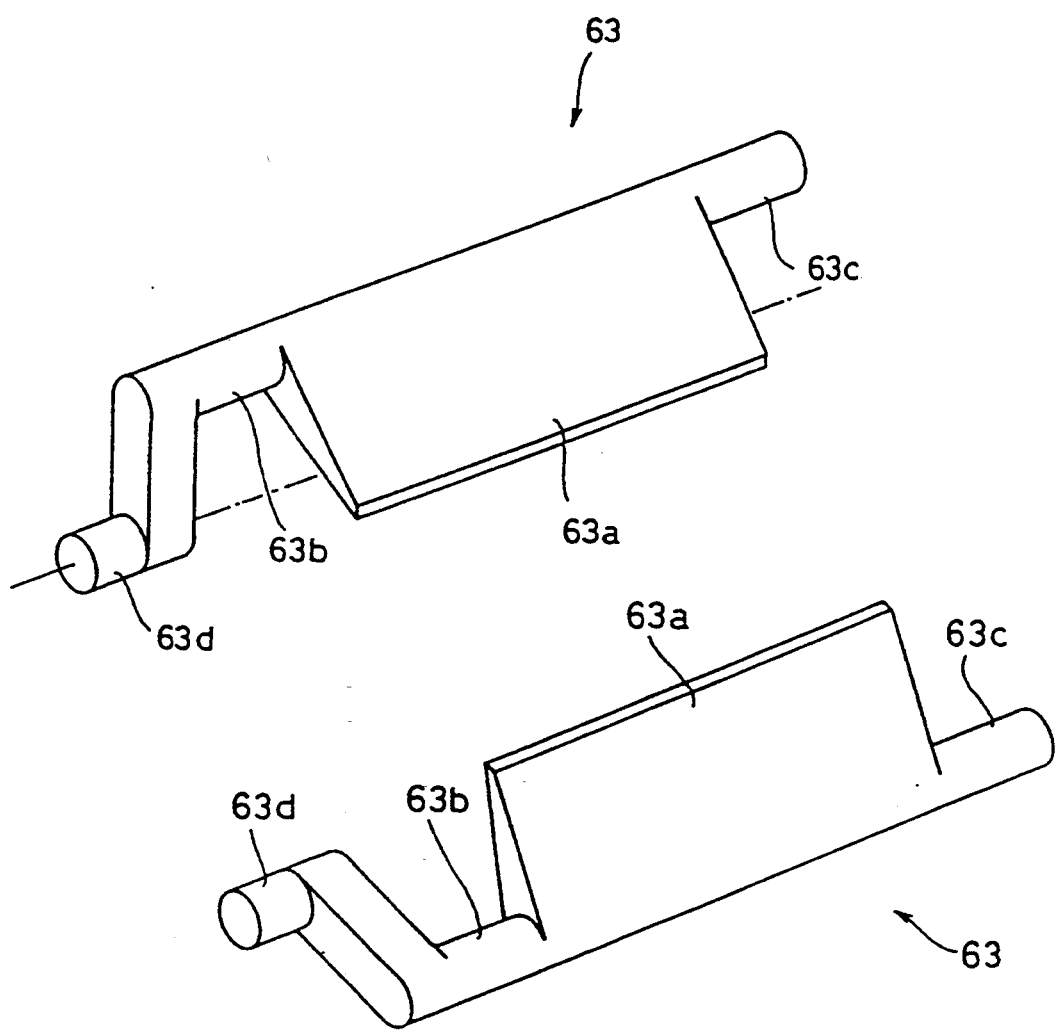
FIG. 15 is an enlarged view of a pair of field frame restricting plates.

As can be seen in FIG. 15, each of the field frame restricting plates 63 is provided with a center restricting plate portion 63a, rotatable shaft portions 63b and 63c provided on opposite sides of the restricting plate portion 63a, and a rotation transmitting portion 63d which is connected to the rotatable shaft portion 63b through a crank-shaped arm. The restricting plate portions 63a substantially lie in planes inclined at a predetermined angle with respect to the shaft portions 63b and the rotation transmitting portions 63d.

Figure 12:
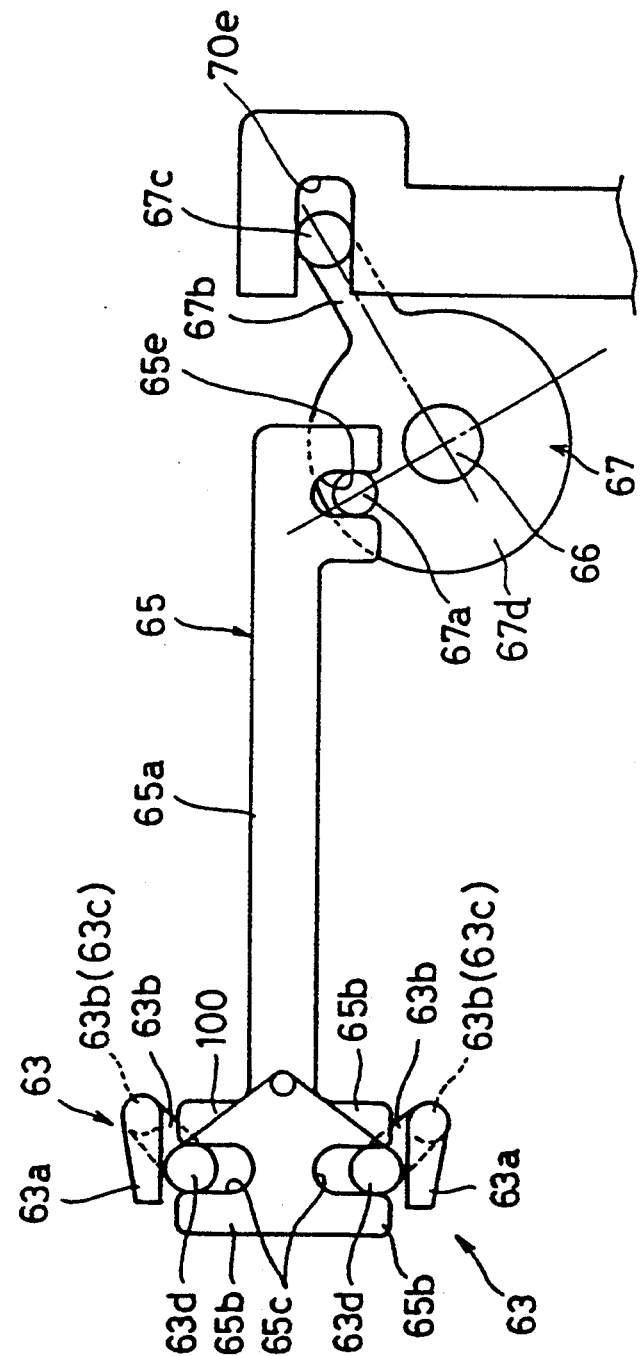
FIG. 12 is an enlarged view of main components of the associating apparatus shown in FIG. 10.

FIG. 12 shows the picture plane and field frame adjusting apparatus in a retracted position. In the standard position shown in FIG. 12 in which the rotation transmitting portions 63d of the field frame restricting plates 63 project towards the view window 17, i.e., in the backward direction of the camera, the rotatable shaft portions 63b and 63c are rotatably supported by the frame 13.

A linear driving lever (i.e., linear driving means) 65 is movably supported in the camera body 9 to impart rotational movement to the field frame restricting plates 63. The driving lever 65 is moved in a direction substantially perpendicular to the linear movement of a driving restriction plate 70 which will be discussed hereinafter. The direction of the linear movement of the driving lever 65 is parallel to the lateral direction (i.e., right and left directions) of the photographing aperture 11 of the camera shown in FIG. 16.

Figure 13:
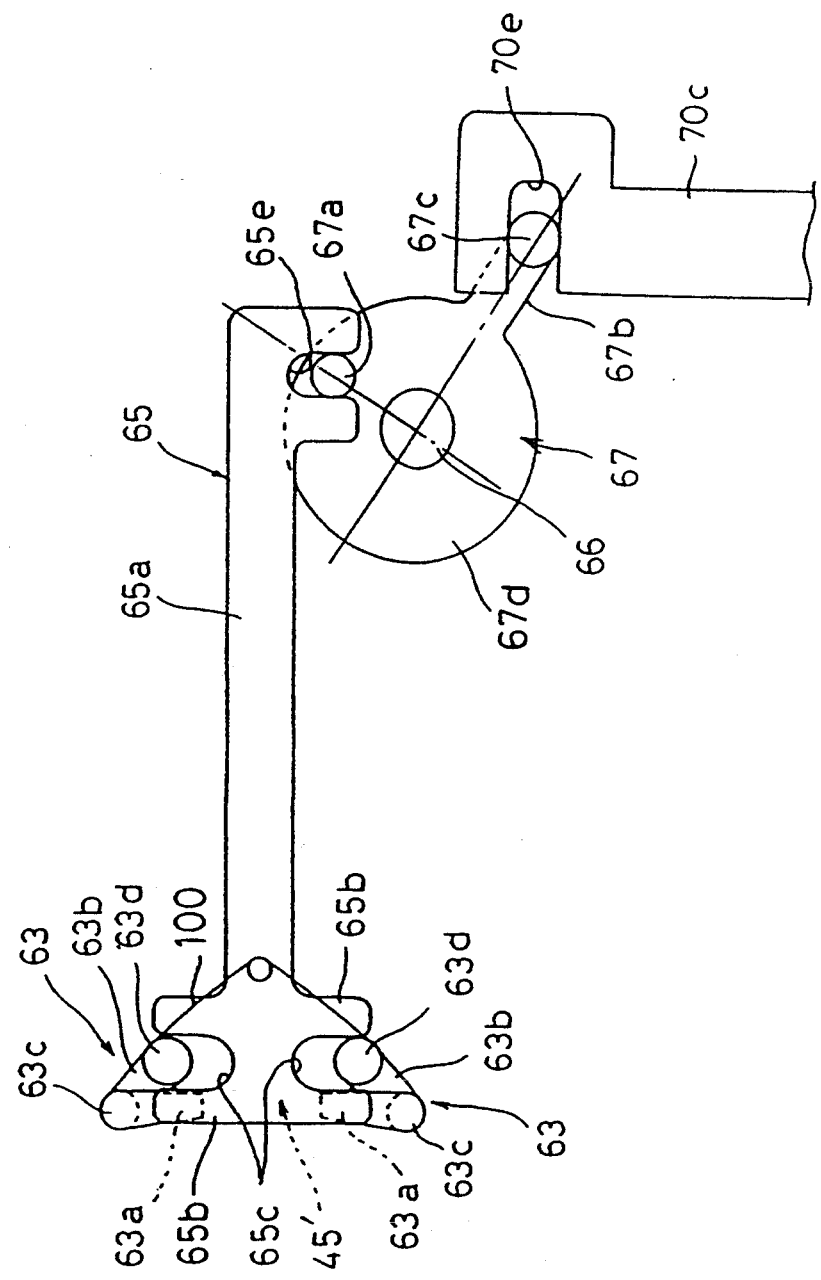
FIG. 13 is an enlarged view of main components of the associating apparatus shown in FIG. 11.

The linear driving lever 65 has a lever body 65a which is provided on the front end thereof with a pair of projections 65b which define a pair of engaging grooves 65c. The engaging grooves 65c are symmetric with respect to the axis of the lever body 65a. The lever body 65a is provided on the opposite end thereof with an elongated engaging groove 65e which opens downwardly in FIG. 13.

In the retracted position shown in FIG. 12, in which the rotation transmitting portions 63d of the field frame restricting plates 63 are fitted in the corresponding engaging grooves 65c, when the linear driving lever 65 is linearly moved in the right hand direction in FIG. 12, the field frame restricting plates 65 are rotated about the shaft portions 63b and 63c to move the restricting plate portions 63a into the optical path of the finder optical system. As a result, the upper and lower edges of the field frame 45 (FIG. 14) are partly covered by the restricting plate portions 63a to intercept light, thereby adjusting the field frame 45 to a panoramic size.

The rotation transmitting portions 63d are biased by a torsion spring 100 which is connected at one end thereof to one of the rotation transmitting portions 63d and at the other end to the other rotation transmitting portion 63d. The torsion spring 100 constitutes a snap-action mechanism. Consequently, when the field frame restricting plates 63 pass the point of instability during the rotation thereof by the driving lever 65 about the shaft portions 63b and 63c, a quick rotation of the field frame restricting plates 63 occurs. Thereafter, the field frame restricting plates 63 are stably held at the extremity of the rotational movement.

Figure 10:
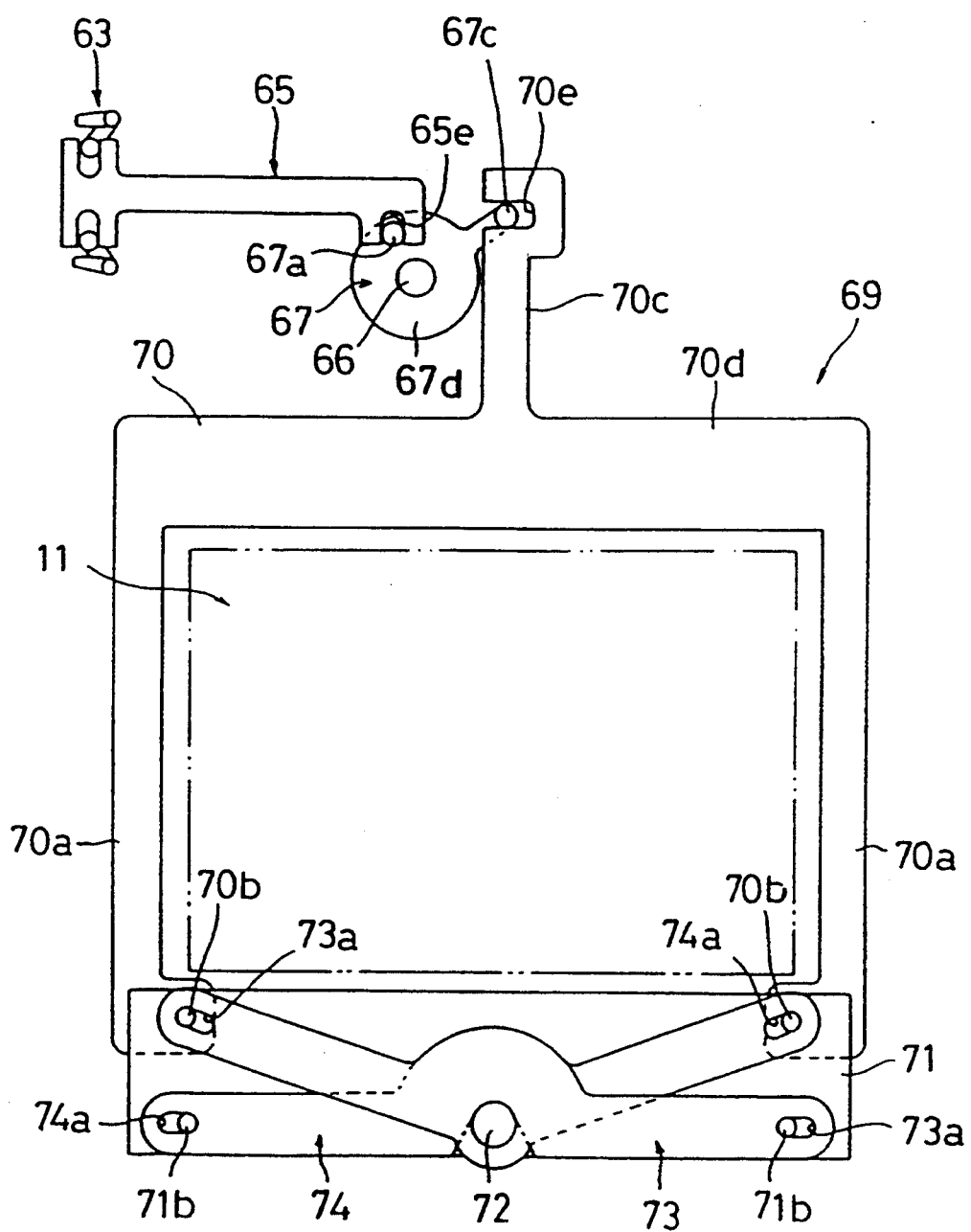
FIG. 10 is a front elevation view of an associating apparatus of a picture plane size switching mechanism and field frame restricting plates, according to the present invention.
Figure 11:
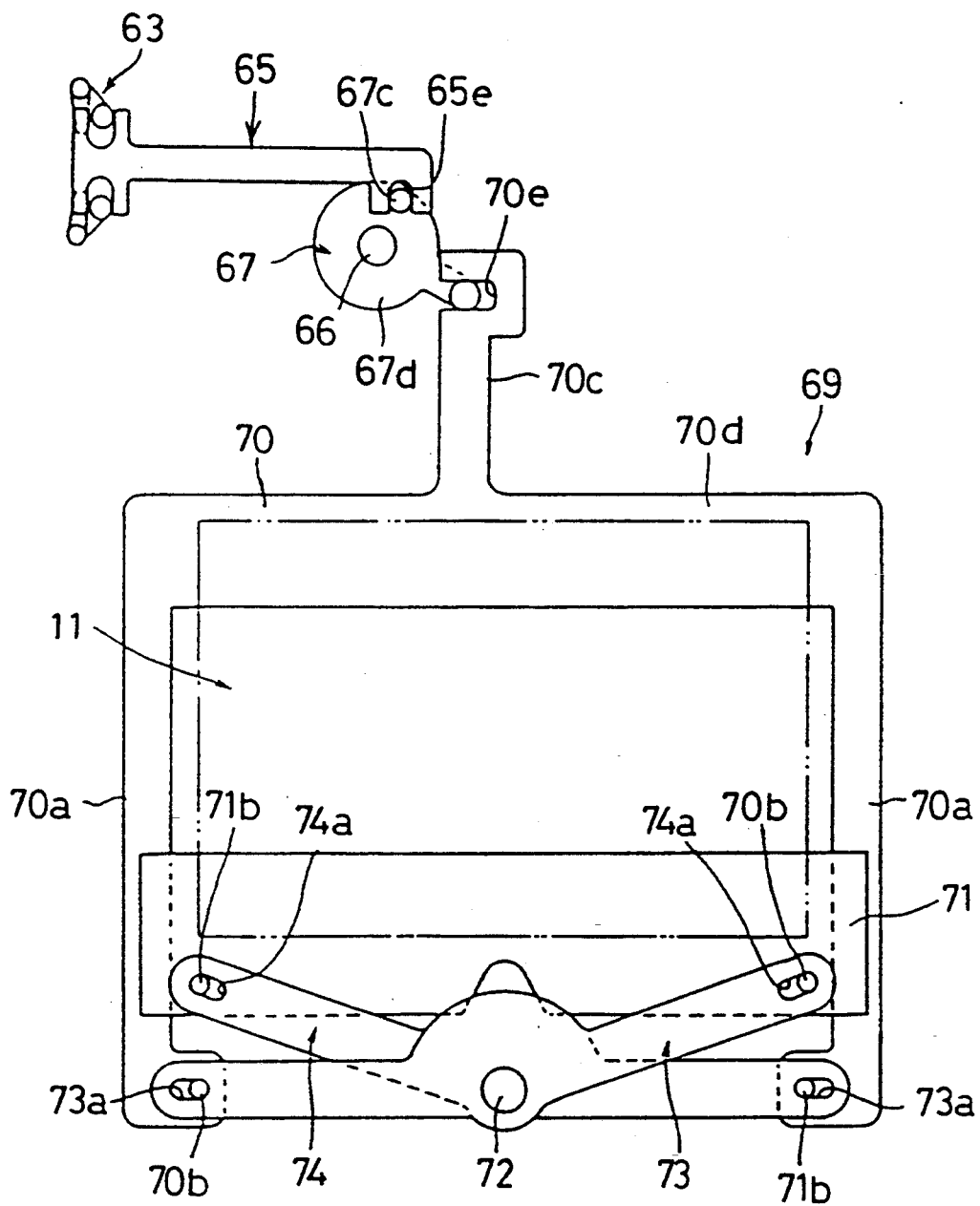
FIG. 11 is a front elevation view of an associating apparatus of a picture plane size switching mechanism and a field frame restricting plates, shown in a panoramic position, according to the present invention.
Figure 16:
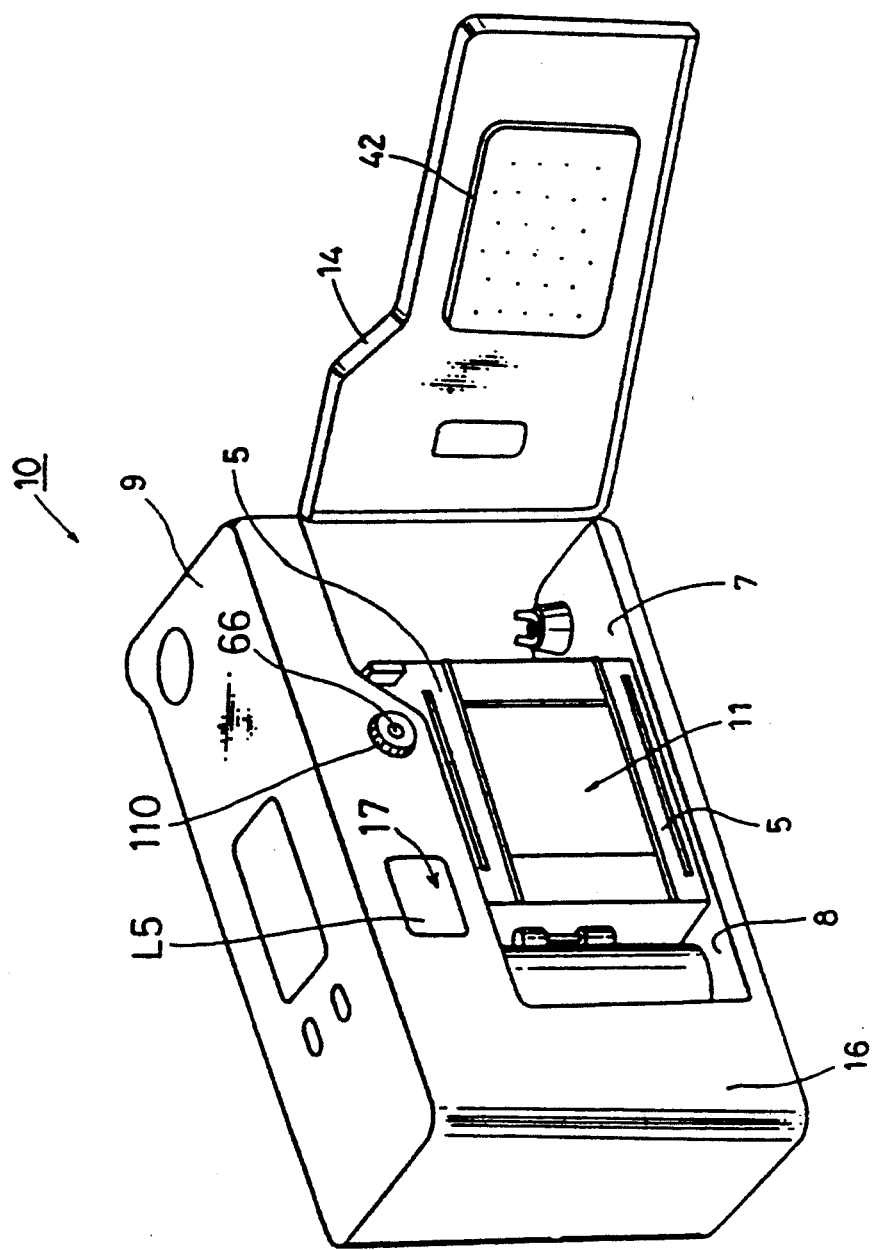
FIG. 16 is a rear perspective view of a camera to which the present invention is applied.

The picture image area size switching mechanism 69 corresponding to the photographing aperture 11, shown in FIGS. 10 and 11 is provided within the aperture frames 5 of the camera body 9 (FIG. 16). In FIGS. 10 and 11, the picture image area size switching mechanism 69 is viewed from behind the camera 10.

The picture image area size switching mechanism 69 has a pair of picture image area restricting plates, i.e., a driving restriction plate 70 and a driven restriction plate 71. The driving restriction plate 70 is generally U-shaped with a center picture image area restricting portion 70d and right and left guide portions 70a which guide the movement of the center picture image area restricting portion 70d into the photographing aperture 11. The guide portions 70a are supported to move up and down by a supporting means (not shown). The driving restriction plate 70 has an engaging arm 70c which projects upward from the center picture image area restricting portion 70d at the median portion thereof. The engaging arm 70c is provided with an elongated engaging groove 70e which is horizontal with respect to the restricting portion 70d.

The driven restriction plate 71 is operatively connected to the driving restriction portion 70 through the associating mechanism so as to come into and out of the photographing aperture 11 while being held between the guide portions 70a.

The associating mechanism includes a pair of connecting rods 73 and 74 which are rotatably interconnected at an intersecting point thereof by a pivot pin 72 which is secured to the camera body 9 and which does not rotate. The connecting rods 73 and 74 are provided on one end thereof with elongated holes 73a and 74a in which support pins 70b, provided on the lower end of the guide portions 70a, are fitted. The connecting rods 73 and 74 are also provided on the other ends thereof with elongated holes 73a and 74a in which support pins 71b, provided on the driven restriction plate 71 and spaced from one another at a predetermined distance, are fitted.

A driving member (i.e., rotational driving means) 67 is rotatably supported on the camera body 9 and between the engaging arm 70c of the driving restriction plate 70 and the driving lever 65 through a support shaft (i.e., rotation support) 66. The support shaft 66 projects backward from the back of the camera body 9 and is provided on the rear end thereof with an operational handle or knob 110 (FIG. 16) which can be manually rotated by an operator to rotate the rotational driving member 67 in the clockwise and counterclockwise directions.

The rotational driving member 67 has a circular body 67d which is provided with a radially extending arm with an engaging projection 67c for the restriction of the picture image area. The rotational driving member 67 is also provided with an engaging projection 67a for the restriction of the field frame. The engaging projection 67a is provided on the peripheral edge of the circular body of the rotational driving member 67 and is angularly spaced from the engaging projection 67c substantially at 90° with respect to the support shaft 66. The engaging projection 67c is engaged in the engaging groove 70e of the engaging arm 70c, and the engaging projection 67a is engaged in the engaging groove 65e of the driving lever 65, respectively. Consequently, rotation of the driving member 67 imparts linear motion to the driving restriction plate 70 and the driving lever 65, which are linearly movable in orthogonal directions.

Note that the shape of the body 67d of the driving member 67 is not limited to a circle, and can be of any shape, as long as the above-mentioned arrangement of the engaging projection 67a for the restriction of the field frame and the engaging projection 67c for the restriction of the picture image area is preserved.

In the zoom finder as constructed above, according to the present invention, when the cam pins 85 and 86 are moved to the respective taking lens accommodating sections d3 in association with the drive of the zoom photographing optical system, so that the zoom finder optical system is located at the wide angle extremity, as can be seen in FIG. 2, the first and second lens assemblies L1 and L2 are spaced farthest from one another. In this state, the prism frame 36 is rotated about the pivot shaft 35 to come to the retracted position.

When the zoom photographing optical system is moved to the zoom section, the pinion 82 which is rotated in association therewith moves the cam plate 15 in the direction H in FIG. 2 through the rack 20 which is in mesh with the pinion 82. Consequently, cam pin 85 is moved towards the object side (direction J) within the zoom section d11, while being guided by the cam groove 21, and the cam pin 86 is guided by the cam portion 22c to first move towards the eyepiece side (direction I) and then move towards the object side (direction J) again (FIG. 3).

As can be understood from the foregoing, since the first and second lens assemblies L1 and L2 that are variable power lens assemblies are moved in the optical axis direction O while keeping a predetermined relationship, the power (magnification) of the zoom finder optical system can be varied in accordance with the magnification of the zoom photographing optical system.

Upon transfer to the macro section d2, when a further movement of the cam plate 15 occurs in the direction H in FIG. 3, the switching pawl 29 of the cam plate 15 comes into engagement with the engaging finger 36c of the prism frame 36 to press the same in the direction H at the telephoto extremity at which the first and second lens assemblies L1 and L2 are located (FIG. 7).

Consequently, the prism frame 36 is quickly rotated in the counterclockwise direction in FIG. 3 by the snap-action mechanism as soon as it passes the point of instability, as mentioned above, so that the parallax error compensating prism 40 is moved to and stably held in the compensating position shown in FIG. 4.

Upon transfer to the zoom section d1 from the macro section d2, when the cam plate 15 is moved in the direction G in FIG. 4, the switching pawl 29 of the cam plate 15 is engaged by the engaging finger 36b of the prism frame 36 to press the same in the direction G (FIG. 8). Consequently, the fast or accelerated rotation of the prism frame 36 in the clockwise direction in FIG. 4 takes place through the snap-action mechanism immediately past the point of instability. Hence, the parallax error compensating prism 40 is quickly rotated to and stably held in the retracted position shown in FIG. 3.

To perform a panoramic photograph, the operational handle 110 on the back of the camera body 9 is rotated in a predetermined direction. Consequently, the driving member 67 is rotated about the support shaft 66 in the clockwise direction in FIG. 10. The rotation of the driving member 67 not only imparts motion to the driving restriction plate 70 through the engagement of the engaging projection 67c in the corresponding engaging groove 70e, but also to the linear driving member 65 through the engagement of the engaging projection 67a in the corresponding engaging groove 65e.

Consequently, the picture image area size switching (adjusting) mechanism 69 switches the photographing aperture 11 to a panoramic size smaller than the standard size (full-open size) by the inward movement of the driving restriction plate 70 and the driven restriction plate 71. At the same time, the field frame restricting plates 63, having the rotation transmitting portions 63d that are engaged in the corresponding engaging grooves 65c of the driving lever 65 which is moved by the engaging projection 67a, are rotated about the shaft portions 63b and 63c in the counterclockwise direction in FIG. 12. As a result, the field frame restricting plate portions 63a of the field frame restricting plates 63 are moved into the optical path of the finder optical system to partly cover the field frame 45 by a predetermined width of the upper and lower edges thereof to thereby realize the panoramic size of field frame.

As can be seen from the above discussion, according to the above embodiment to which the present invention is applied, the movement of the picture plane restricting plate constituted by the driving restriction plate 70 and the driven restriction plate 71, as well as the movement of the field frame restricting plates 63 in association with the movement of the picture image area restricting plate is effected by the rotation of the driving member 67 which constitutes the linearly driving means. Thus, a simple switching and associating apparatus can be obtained.

Although the invention has been described with reference to particular means, materials and embodiments, it is to be understood that the invention is not limited to the particulars disclosed and extends to all equivalents within the scope of the claims.

We claim:

1. An apparatus of a camera for adjusting the size of a picture image area and a field frame of a view finder in an associated manner, comprising:
   a picture image area restricting member that is linearly movable into and out of a photographing aperture;
   a field frame restricting member movable into and out of said field frame;
   a driven member for moving said field frame restricting member;
   a rotatable operating member connected to said picture image area restricting member and said driven member whereby a rotation of said rotatable operating member causes linear motion of both said picture image area restricting member and said driven member, respectively.

2. The apparatus of claim 1, wherein said picture image area restricting member comprises a driving restriction plate which is directly moved by said rotatable operating member and a driven restriction plate which is linearly moved in a direction opposite to a direction of movement of said driving restriction plate in association with said movement of said driving restriction plate.

3. The apparatus of claim 2, wherein said driving restriction plate and said driven restriction plate are provided on opposite sides of said photographing aperture.

4. The apparatus of claim 3, further comprising:
   an associating mechanism which functionally connects the driving restriction plate and the driven restriction plate so as to effect said associated movement of said driving restriction plate and said driven restriction plate towards and away from each other.

5. The apparatus of claim 4, wherein said associating mechanism comprises a pair of intersecting rods which are rotatably connected at their intersection through a pivot and which are connected at opposite ends thereof to said driving restriction plate and said driven restriction plate.

6. The apparatus of claim 1, wherein said field frame restricting member comprises a pair of field frame restricting plates having restricting plate portions which are selectively moved into said field frame of said finder to partly cover said field frame at upper and lower edges thereof to thereby intercept light.

7. The apparatus of claim 6, further comprising:
   a finder body which defines an optical path of a finder optical system of said finder.

8. The apparatus of claim 7, wherein each of said field frame restricting plates is provided with shaft portions which can be rotatably supported by said finder body on opposite sides of said restricting plate portions, and a rotation transmitting portion which is integral with and offset from one of said shaft portions.

9. The apparatus of claim 8, wherein said field frame restricting plates are rotatably supported by said finder body through said respective shaft portions, so that said rotation transmitting portions project outward in the same direction.

10. The apparatus of claim 9, further comprising:
    a snap-action mechanism which causes a quick rotation of said field frame restricting plates immediately past a point of instability.

11. The apparatus of claim 10, wherein said snap-action mechanism comprises a torsion spring which is engaged at opposite ends thereof with said rotation transmitting portions.

12. The apparatus of claim 8, wherein said driving means comprises a linear driving lever which is linearly movable and is provided with a pair of engaging grooves in which said rotation transmitting portions of said field frame restricting plates are fitted to impart said rotational movement to said field frame restricting plates.

13. The apparatus of claim 12, wherein said linear driving lever is provided with an elongated engaging groove through which said linear motion is imparted by said rotatable operating member.

14. The apparatus of claim 1, wherein said rotatable operating member comprises a rotor having a circular body which is provided thereon with a first engaging projection, through which movement is imparted to said picture image area restriction member, and a second engaging projection, through which movement is imparted to said field frame restricting member.

15. The apparatus of claim 14, wherein said first engaging projection is provided on a radial arm extending from said circular body in a radial direction, and wherein said second engaging projection is provided on a peripheral edge of said circular body and is angularly spaced from said first engaging projection by approximately ninety degrees with respect to a center axis of said circular body.

16. The apparatus of claim 15, wherein said driving means comprises a linear driving lever which is linearly movable and is provided with an engaging groove in which said second engaging projection is engaged to impart said linear movement.

17. The apparatus of claim 16, wherein said picture image area restricting plates are provided with an elongated engaging groove in which said first engaging projection is engaged to impart said linear movement.

18. The apparatus of claim 1, further comprising:
an operational handle on an associated camera body to manually rotate said rotatable operating member.

19. An apparatus of claim 18, wherein said operational handle is on the outside of said associated camera body.

20. An apparatus of claim 1, said driven means moving said field restricting member into and out of said field frame by rotating said field restricting member.

21. An apparatus according to claim 1, wherein said respective linear motions of said picture image area restricting member and said driven member are oriented in linear directions which are parallel to an image plane of said camera.

22. An apparatus of a camera for adjusting the size of a picture image area and a field frame of a view finder in an associated manner, comprising:
- a picture image area restricting member that is linearly moveable into and out of a photographing aperture;
- a field frame restricting member movable into and out of said field frame;
- a linearly driven member for imparting movement to said field frame restricting member; and
- a rotatable operating member for linearly driving said picture image area restricting member and said linearly driven member of said field frame restricting member, said linearly driven member of said field restricting member converting said linear driving movement of said linearly driven member of said field frame into a rotational movement of said field frame restricting member.

* * * * *